United States Patent Office 3,407,072
Patented Oct. 22, 1968

3,407,072
PROCESS FOR PREPARING AN ACTIVE,
DRY POWDERY YEAST
Minoru Aizawa, Tetsuro Matsuda, Shuichi Kawabata, Isao Omura, Isao Amano, and Takashi Nakamura, Shizuoka-ken, Japan, assignors to Toyo Jozo Co., Ltd., Tagata-gun, Japan, a corporation of Japan
No Drawing. Filed May 24, 1965, Ser. No. 458,437
Claims priority, application Japan, May 29, 1964, 39/30,059; Nov. 16, 1964, 39/64,331; Dec. 7, 1964, 39/68,450
3 Claims. (Cl. 99—96)

ABSTRACT OF THE DISCLOSURE

An active powdered dry yeast is prepared by spray drying a suspension of yeast in combination with an osmotic active agent selected from the group consisting of alkali metal salts of mineral acids, alkali metal salts of organic acids, polyhydric alcohols, xylose, and urea.

The present invention relates to a process for preparing an active, dry powdery yeast which comprises powdering the yeast without lowering the fermentation activity thereof.

The conventional dry yeast has so far been of higher preservability and more convenient for transportation than the compressed yeast, but it is obtained, as a product in the form of granule or globule, so it is required such a troublesome procedure for the application, e.g., production of bread, that the dry yeast is previously suspended in a sugar solution, and the resulting suspension is left standing for a few score minutes to activate the yeast (as called prefermentation), and then is kneaded with flour to obtain a dough.

If the conventional dry yeast is mixed as it is with flour in order to avoid such troublesome procedure, the yeast can hardly be dispersed in the dough, in which therefore a sufficient fermentative ability is not obtained. On the other hand, if the dry yeast is crushed to be more dispersible therein, its activity is necessarily lowered by the remarkable damage of the yeast cell.

There has so far been made a trial for the production of the active, dry yeast by subjecting the wet yeast to spray drying, wherein, for example, a high active, dry yeast could hardly be obtained, unless the drying was carried out at such low temperatures as 30° C. at the inlet and 10° C. at the outlet in a drier.

The object of the present invention is to provide a process for preparing a high active, dry yeast which is free from said drawbacks, though the drying is carried out efficiently at a high temperature, for example, 75°–150° C. as the inlet temperature.

As the result of endeavourous investigation for the achievement of said object, the present inventors have now found that said object can be accomplished by subjecting a concentrated suspension of yeast to spray drying in the presence of one or more compounds having an osmotic action to the yeast cell without inhibiting the fermentative ability of the yeast.

It is necessary at the spray drying of said suspension that the activity of the yeast is never inhibited by said compounds in either the wet state or the dry state. Therefore, it is desirable to prevent the yeast from lowering its activity during the spray drying and at the same time to make the spray drying easier by lowering the viscosity of the suspension.

The satisfiable compounds for said requirements include the alkali metal salts of hydrochloric acid, phosphoric acid, nitric acid and sulfuric acid; the alkali metal salts of organic acids such as acetic acid, propionic acid, lactic acid, succinic acid, malic acid, fumaric acid, glycolic acid and the like; polyhydric alcohols such as glycerin, sorbitol, propylene glycol and the like; non-fermentable saccharides for the yeast such as lactose, xylose and the like; and urea. Said object is achieved by adding the suspension of yeast with a proper amount of one or more members selected from the group consisting of said compounds and subjecting the resulting admixture to spray drying.

On the one hand, those which are not satisfied with said requirement can not be used in this invention, for example, ammonium sulfate is not suitable in spite of being usually used as the nutritive source of the yeast, because the fermentative ability of the yeast is lowered so greatly at the spray drying that the yeast thus obtained can not be put to practical use.

When a suspension prepared by merely suspending the compressed yeast in water is subjected as it is to spray drying at a high inlet temperature such as 75°–150° C., the cell membrane is damaged by the rapid dehydration of the yeast cell, consequently the fermentative ability of the product is lowered and the yeast of high activity is not obtained. According to the present invention, the lowering of the activity can almost be avoided by the spray drying of the suspension of yeast in the presence of said compounds. With regard to the action mechanism of said compounds, it may be understood that the compounds acting osmotically in the suspension are thickened and the osmotic pressure is increased corresponding to the rapid dehydration in the spray drying, the shrinkage of the yeast cell and the dehydration of the cell can be made smoothly, consequently the state of the cell is maintained naturally with very small damage of the cell membrane, and the activity of the yeast is also preserved.

The application amount of said compounds, though it varies with a difference of osmotic pressure of each solution respectively, ranges generally from about 2 to 40 g. based on 1 kg. of the compressed yeast. Even in a case that the compounds are applied in an amount larger than said range, the product of much higher activity is obtained as compared with one obtained by spray drying the suspension of yeast in water without any additive.

The dry yeast according to the present invention is obtained in the form of powder and therefore does not require such a complicated pretreatment procedure as is required in case of using the conventional dry yeast in the form of granules. For example, said dry, powdery yeast for bread making is admixed as it is with flour and the admixture being added with water can immediately be used as the dough. Further, the fermentative activity of said product is so high that the procedure of prefermentation is not required. The following table gives the results of the dough-raising test of the dry, powdery yeasts which are prepared by adding a proper amount of each compound in the table to the suspension of yeast and drying the admixture at a high temperature (inlet temperature: 100°–120° C.) by means of a spray drier.

TABLE 1.—DOUGH-RAISING TEST OF THE POWDERY YEASTS

| Compound added | Amount of addition 1 kg. compressed yeast | Water content (%) | Strength (ml.) | | |
|---|---|---|---|---|---|
| | | | 1.5 hr. | 2.0 hr. | 2.5 hr. |
| Control | 0 g | 8.0 | 260 | 310 | 380 |
| Common salt | 5 g | 8.1 | 350 | 460 | 500 |
| Potassium nitrate | 4 g | 7.9 | 340 | 440 | 490 |
| Sodium acetate | 8 g | 7.3 | 345 | 450 | 520 |
| Sodium lactate | 15 g | 8.2 | 400 | 480 | 510 |
| Urea | 20 g | 7.8 | 420 | 500 | 520 |
| Lactose | 20 g | 8.3 | 420 | 495 | 515 |
| Sorbitol | 20 g | 7.5 | 400 | 485 | 510 |
| Glycerin | 20 ml | 9.3 | 430 | 505 | 520 |
| Urea+common salt | 8 g.+2 g | 7.5 | 410 | 495 | 520 |
| Glycerin+urea | 10 ml.+10 g | 8.0 | 405 | 510 | 530 |
| Lactose+potassium chloride | 10 g.+2 g | 7.8 | 390 | 490 | 530 |

In the table, "Control" is powdery yeast obtained by subjecting the suspension to spray drying.

With regard to the method of the test, 100 g. of flour, 20 g. of sugar, 1 g. of common salt and 1 g. of the powdery yeast are well mixed with each other, and the mixture being added with 55 ml. of water is kneaded at 30° C. to obtain the dough, then the dough is put into a glass measuring cylinder of about 6.5 cm. inside diameter and is subjected to fermentation at 30° C. in an incubator. With proceeding of fermentation of 1.5, 2.0 and 2.5 hours, the strength of yeast is measured by the volumes (ml.) of the dough.

It is very obvious from the results of the test that the activity of the dry, powdery yeast according to the present invention is much superior to the control.

to the drying. Especially, the emulsion formed by using lecithin decreases the viscosity of the suspension or yeast in a high degree, whereby facilitates the drying operation.

If the amount of these additives is in excess, the operation of spraying drying becomes rather difficult due to the increased viscosity of the suspension and the fermentative ability of the product is lowered.

One example for the optimum amounts of these subsidiary agents is given below, that is, 3 to 5 gr. in carboxy cellulose, 3 to 10 gr. in lecithin, 0.3 to 2 gr. polyphosphate and 0.3 to 2 gr. in ascorbic acid based on 1 kg. of the compressed yeast.

Table 2 shows the effects of these subsidiary agents, which are tested by the same method as mentioned above.

TABLE 2.—EFFECT OF SUBSIDIARY AGENTS ON THE POWDERY YEAST

| Composition of powdery yeast | | Water content (%) | Strength (ml.) | | |
|---|---|---|---|---|---|
| Amount of compound added per 1 kg. compressed yeast | Amount of subsidiary agents added per 1 kg. compressed yeast, grams | | 1.5 hr. | 2.0 hr. | 2.5 hr. |
| Common salt, 5 g | CMC [1], 3 | 8.0 | 380 | 480 | 520 |
| Potassium acetate, 4 g | Lecithin 3; CMC 3 | 6.5 | 375 | 475 | 520 |
| Sodium acetate, 8 g | Lecithin 4; Methyl cellulose 2 | 7.5 | 390 | 480 | 530 |
| Sodium lactate, 15 g | Sodium alginate 2 | 8.2 | 430 | 500 | 530 |
| Urea, 20 g | Lecithin 8; Gual gum 1 | 8.0 | 450 | 520 | 535 |
| Lactose, 20 g | Lecithin 4; CMC 2; BHT [2] 0.5 | 8.2 | 470 | 510 | 520 |
| Sorbitol, 20 g | Sodium metaphosphate 1; Vitamin C 0.5 | 7.4 | 415 | 500 | 510 |
| Glycerin, 20 ml | Lecithin 8 | 9.6 | 475 | 530 | 540 |
| Urea, 8 g.+Common salt, 2 g | Sodium erythorbate 1 | 8.0 | 420 | 495 | 530 |
| Glycerin, 10 g.+Urea, 10 g | CMC 2 | 8.1 | 440 | 520 | 525 |
| Lactose, 10 g.+Potassium chloride, 2 g | Potassium tripolyphosphate 1 | 8.0 | 400 | 490 | 530 |

[1] CMC=Carboxyl methyl cellulose.   [2] BHT=Dibutyl hydroxy toluene.

The present inventors have also found that, in the process of the present invention, if the suspension of yeast to be dried is added with one or more members of subsidiary agents such as natural gum, carboxy methylcellouse, methyl cellulose, polyphosphate, lecithin, ascorbic acid and the like, the activity of the yeast is stabilized at the stages of the spray drying and rehydration.

This effect may be obtained by controlling the dehydration degree of the yeast at the stage of the drying and protecting the cell membrane from the impulse due Further, the dry yeast according to the present invention does not require such a complicated pretreatment as in the conventional granular dry yeast, but can be used by admixing as it is with flour and then water to give immediately the dough. That is, as shown in Table 3, a vigorous fermentative ability can be obtained even in a case that the dry yeast according to the present invention is admixed as it is with flour and is used as the dough.

On the contrary if the conventional granular dry yeast is admixed as it is with flour or crushed and then admixed with flour, the fermentative ability is very weak.

TABLE 3.—COMPARISON OF THE FERMENTATIVE ABILITY BETWEEN THE PRODUCTS OF THE PRESENT INVENTION AND THE GRANULAR PRODUCTS WHEN DIRECTLY MIXED WITH FLOUR

| Kinds of dry yeast | Testing method | Strength (ml.) | |
|---|---|---|---|
| | | 60 min. | 90 min. |
| Granular | No prefermentation [2] | 240 | 320 |
| Do | 20 min. prefermentation [3] | 285 | 380 |
| Do | Mixing method [4] | 210 | 240 |
| Powdery (granule-crushed) | do | 150 | 160 |
| Powdery (according to the present invention) [1] | do | 380 | 490 |

[1] The dry, powdery yeast prepared by adding glycerin and lecithin to the suspension of yeast and subjecting the mixture to spray drying.

[2] 1 gr. of the yeast was previously suspended in 15 ml. of water of 40° C. containing 1 gr. of sugar and was immediately added with 100 gr. of flour, 20 gr. of sugar and 1 gr. of common salt. Then, being added with 40 ml. of water, the mixture was well kneaded to obtain a dough. Controlling the dough at 30° C., putting the kneaded mixture into a glass cylinder of about 6.5 cm. of inside diameter having the graduations of volume and carrying out the fermentation at 30° C. in an incubator, the strength of the yeast was measured by the expanded volume of the dough after 60 min. and 90 min. fermentation.

[3] 1 gr. of the yeast was previously suspended in 15 ml. of water of 40° C. containing 1 gr. of sugar and was subjected to the prefermentation at 30° C. for 20 minutes. Then, in the same manner as in 2, the dough was prepared by adding flour and others to the suspension prefermented.

[4] 100 gr. of flour, 20 gr. of sugar, 1 gr. of common salt and 1 gr. of the dry yeast were previously mixed with each other. Then, being added with 55 ml. of water, the mixture was well kneaded to prepare a dough. The test was made as described in 2.

The present invention is illustrated by the examples but not limited thereby.

EXAMPLE 1

After 3 kg. of common salt was dissolved in 1000 l. of the yeast suspension of yeast having a concentration to 60 weight percent by volume calculated as the compressed yeast, this suspension was dried by means of a spray drier at 100° C. of inlet temperature and 65° C. of outlet temperature, to obtain the powdery yeast containing 6 to 7% of water content.

EXAMPLE 2

3 kg. of common salt was added to 1000 l. of the suspension having a concentration to 60 weight/volume percent calculated as compressed yeast. This suspension was added with 1.8 kg. of salt proof carboxy methyl cellulose, which had previously been dissolved in 70 l. of 40° C. warm water. Then, according to the same process as in Example 1, the powdery yeast was obtained.

EXAMPLE 3

8 kg. of sodium acetate were added to 1550 l. of the yeast suspension [65% (weight/volume)] and were dissolved by stirring. It was subjected to spray drying at 120° C. of inlet temperature and 67° C. of outlet temperature, to obtain the powdery yeast containing 6.8% of water content.

EXAMPLE 4

8 kg. of sodium acetate were added to 1550 l. of the yeast suspension [65% (weight/volume)]. Thereto, an emulsion containing 4 kg. of lecithin and 2 kg. of methyl cellulose in 100 l. of 50° C. warm water was added, after well stirred, the suspension was subjected to spray drying according to the same process as in Example 3, to obtain the powdery yeast.

EXAMPLE 5

1000 kg. of the compressed yeast were added with 500 l. of water containing 4 kg. of potassium nitrate and were left alone for 30 minutes. Thereto, a solution dissolving 3 kg. of lecithin and 3 kg. of carboxy methyl cellulose in 150 l. of 50° C. warm water was added, after well stirred, the suspension was subjected to spray drying according to the same process as in Example 1, to obtain the powdery yeast containing 6.5% of water content.

EXAMPLE 6

1550 l. of the yeast suspension [65% (weight/volume)] were added with a solution emulsifying and dispersing 4 kg. of lecithin, 3 kg. of carboxy methyl cellulose and 0.5 kg. of dibutyl hydroxy toluene in 120 l. of 50° C. warm water. Thereto, 20 kg. of lactose were added and well dissolved. It was subjected to spray drying at 120° C. of inlet temperature, to obtain the powdery yeast containing 8.2% of water content.

EXAMPLE 7

1350 l. of the yeast suspension having a concentration corresponding to 75% (weight/volume) of the compressed yeast were added with a solution emulsifying and dispersing 8 kg. of lecithin in 100 l. of 60° C. warm water. Thereto, 20 l. of glycerin were added and well mixed. It was dried by a spray drier at 100° C. of inlet temperature and 65° C. of outlet temperature and the powder was immediately cooled by the pneumatic conveyer, to obtain the powdery yeast containing 9.6% of water content.

In the examples which follow there are given the examples for the production of bread by using the powdery yeast according to the present invention.

EXAMPLE 8

Sponge and dough method for plain bread

In the sponge and dough method, they are divided into the two stages, i.e., sponge and dough stage, wherein the compositions of materials are as shown in Table 4.

TABLE 4

|  | Sponge | Dough |
|---|---|---|
| Flour, kg | 70 | 30 |
| Powdery yeast [1], kg | 1 | 0 |
| Sugar, kg | 0 | 5 |
| Common salt, kg | 0 | 2 |
| Shortening, kg | 0 | 4 |
| Water, kg | 36 | 21 |
| Fermentation time, hrs | 4 | |
| Kneading time, min | 5 | 8 |
| Dough temp., °C | 24 | 29 |

[1] The powdery yeast which was prepared by adding common salt, lecithin and carboxy methyl cellulose to the suspension of yeast and spray drying of the admixture.

In the preparation of the sponge, flour is, and then the powdery yeast is, charged in into a mixer and is mixed therewith. Thereafter the mixture is kneaded in the presence of water, according to the general process, after the fermentation of the sponge, the dough process runs. In the dough stage, the materials shown in Table 4 are added to the sponge and they are kneaded by means of a mixer. After completing the kneading, the dough is divided molded, proofed, and then baked in an oven.

EXAMPLE 9

Straight dough method

The composition of the materials to be mixed and pitching condition are as follows. In the pitching, the powdery yeast is charged into a mixer. Thereto, flour and then other materials except shortening are charged. After rotating the mixer for 1 minute, water and then shortening are added individually and the admixture is kneaded. The production of bread is thereafter carried out by the normal process.

Composition of straight dough process:

| | | |
|---|---|---|
| Flour | kg | 100 |
| Powdery yeast [1] | kg | 1.5 |
| Sugar | kg | 5 |
| Common salt | kg | 2 |
| 45 RAOS [2] ® | kg | 0.2 |
| Shortening | kg | 4 |
| Water | kg | 58 |
| Mixing time | min | 12 |
| Dough | °C | 30 |

[1] The powdery yeast which was prepared by adding sodium lactate, carboxy methyl cellulose and lecithin to the suspension of yeast spray-drying of the admixture.
[2] Trade name of R "Yeast Food," made by Toyo Jozo Co., Ltd., Japan.

This invention is not limited by the production of powdery yeast for bread but is applicable to the production of powdery yeast for other objects, for example, powdery yeast for alcoholic fermentation.

What is claimed is:

1. A process for preparing active powdered dry yeast comprising forming a suspension comprising yeast as the major ingredient and including a minor portion of a compound having an osmotic action on the yeast cell without inhibiting the fermentable ability of the yeast, said compound being selected from the group consisting of alkali metal salts of mineral acids, alkali metal salts of organic acids, polyhydric alcohols, xylose, and urea and spray drying said suspension at an inlet temperature of 75 to 150° C.

2. A process in accordance with claim 1, wherein said compound having osmotic action is present in the quantity of 2 to 40 grams of said compound per kilogram of yeast, calculated on the basis of moist compressed yeast.

3. A process in accordance with claim 1, wherein said suspension further contains a stabilizing agent selected from the group consisting of natural gum, carboxymethyl cellulose, methyl cellulose, polyphosphate, lecithin, sodium, alginate and ascorbic acid, in an amount not exceeding 10 grams of said stabilizing agent per kilogram of yeast, calculated on the basis of moist compressed yeast.

References Cited

UNITED STATES PATENTS

| | | | |
|---|---|---|---|
| 1,706,564 | 3/1929 | Dawson | 99—96 |
| 1,706,565 | 3/1929 | Dawson | 99—96 |
| 2,111,201 | 3/1938 | Auden et al. | 99—96 X |
| 2,710,810 | 6/1955 | Strashun | 99—96 X |
| 2,808,334 | 10/1957 | Battiste | 99—96 X |

FOREIGN PATENTS

| | | |
|---|---|---|
| 181,334 | 5/1923 | Great Britain. |

A. LOUIS MONACELL, *Primary Examiner.*

D. M. NAFF, *Assistant Examiner.*